Figure 1A:
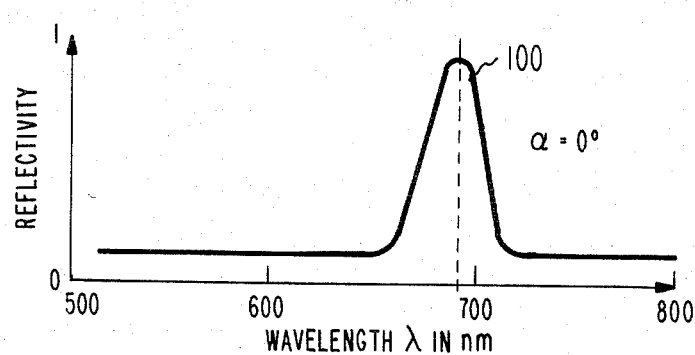

United States Patent [19]

Sandercock

[11] Patent Number: 4,526,466
[45] Date of Patent: Jul. 2, 1985

[54] TECHNIQUE FOR VERIFYING GENUINENESS OF AUTHENTICATING DEVICE

[75] Inventor: John R. Sandercock, Affoltern, Switzerland

[73] Assignee: RCA Corporation, Princeton, N.J.

[21] Appl. No.: 528,450

[22] Filed: Sep. 1, 1983

[51] Int. Cl.$^3$ .......................... G06K 7/00; G06K 9/00
[52] U.S. Cl. ........................................ 356/71; 356/394
[58] Field of Search .................................. 356/71, 394

[56] References Cited

U.S. PATENT DOCUMENTS 4,484,797 11/1984 Knop et al. ..................... 350/162.19

Primary Examiner—Vincent P. McGraw
Attorney, Agent, or Firm—Joseph S. Tripoli; George E. Haas; George J. Seligsohn

[57] ABSTRACT

A given type of authenticating device operates as a diffractive subtractive color filter that exhibits a reflectivity spectrum that includes a peak occurring at a wavelength that varies as a substantially linear function of the angle of incidence of polychromatic illuminating light having a particular polarization. The verification technique involves simultaneously illuminating a sample device over a range of angles of incidence by the polychromatic light, and then employing the reflected light from the sample to illuminate a reference device known to be genuine over the same range of angles of incidence. A sample device is indicated as being genuine only if both the respective intensity ratios of the light reflected from the reference device to the polychromatic light and to the light reflected from the sample device exceed respective threshold values.

10 Claims, 5 Drawing Figures

TECHNIQUE FOR VERIFYING GENUINENESS OF AUTHENTICATING DEVICE

This invention relates to a test method and system for verifying whether a sample purporting to be a given type of authenticating device for an item of sheet material is genuine.

Reference is made to co-pending U.S. patent application Ser. No. 387,614, filed June 11, 1982 by Knop, et al. and entitled "Diffractive Subtractive Color Filter Responsive to Angle of Incidence of Polychromatic Illuminating Light," now U.S. Pat. No. 4,484,797, which is assigned to the same assignee as the present invention. This application discloses a diffraction grating structure which is useful as an authenticating device for an item of sheet material. This grating structure operates as a diffractive subtractive color filter responsive to the angle of incidence of continuous-spectrum polychromatic illuminating light that has its E vector polarized substantially parallel to the grating lines of the structure. Published British application No. 2113421A, dated Aug. 3, 1982, which is the British counterpart of the aforesaid U.S. patent application, discloses in detail numerous species of diffraction grating structures each of which operates as a diffractive subtractive color filter responsive to the angle of incidence of polychromatic illuminating light. Specifically, such a grating structure is comprised of a relatively low index-of-refraction substrate layer having a relief pattern defining a diffraction grating embossed on a surface thereof; a relatively high index-of-refraction dielectric coating layer deposited on the surface relief pattern of the substrate layer; and a relatively low index-of-refraction overcoat layer covering the dielectric layer. The diffraction grating line period is smaller than the substantially free-space wavelength of light traveling in air or the even smaller wavelength of light traveling in the relatively low index-of-refraction substrate or overcoat layers. However, the diffraction grating structure line period is larger than the wavelength of light traveling within the high index-of-refraction dielectric coating layer. The result is that both zero diffraction order light and first diffraction order light can propagate within the high index-of-refraction coating layer, but only zero diffraction order light can propagate in the low index-of-refraction substrate and overcoat layers and in air.

Such a diffraction grating structure serves to separate incident polychromatic light into respective complementary-colored reflected and transmitted portions. The wavelength-spectrum (and hence the color) of the reflected portion of light depends on such factors as the diffraction grating structure profile, the respective values of the indices-of-refraction of the substrate, dielectric coating and overcoat layer; the relative values of the line spacing period and the dielectric coating layer thickness with respect to the free-space wavelengths included in the incident polychromatic light; the angular orientation of the E and H vectors of the incident polychromatic light with respect to the diffraction-grating lines; and the angle of incidence of the incident polychromatic light with respect to the diffraction grating structure.

From the point of view of the present invention, the important characteristic of this type of diffraction grating structure, when used as an authenticating device, is that in response to the illumination thereof by continuous-spectrum polychromatic light (e.g., white-light from a lamp) that has its E vector polarized substantially parallel to the grating lines of the structure, it reflects colored light having a wavelength spectrum within the continuous spectrum that includes at least one peak occurring at a wavelength that varies as a predetermined substantially linear function of the angle of incidence of the polychromatic illuminating light. As taught in the aforesaid patent application, this characteristic permits machine identification to be utilized to verify whether a sample purporting to be such an authenticating device is genuine or is counterfeit.

The present invention is directed to a simple and inexpensive testing technique for providing such machine identification. This is accomplished by comparing the color-filtering characteristics of a sample with those of a reference device known to be a given type of genuine authenticating device incorporating the teachings of the aforesaid patent application Ser. No. 387,614. More specifically, in accordance with the principles of the present invention, the sample is simultaneously illuminated with a continuous spectrum polarized polychromatic first light beam over an angular range of angles of incidence between $\alpha_1$ and $\alpha_2$, in which $\alpha_1$ and $\alpha_2$ are two different oblique angles of incidence situated on the same given side of the normal to the sample as one another. The polarized polychromatic first light beam is polarized with its E vector oriented substantially parallel to the grating lines of a genuine sample. This results in a genuine sample reflecting a polarized colored second light beam that has an angular range of angles of reflection between $\alpha_3$ and $\alpha_4$, in which $\alpha_3$ and $\alpha_4$ are respectively substantially equal in value to $\alpha_1$ and $\alpha_2$ and are suited on the opposite of the normal to the sample from $\alpha_1$ and $\alpha_2$. The reference device is then simultaneously illuminated with this polarized colored second light beam over an angular range of angle of incidence between $\alpha_5$ and $\alpha_6$, in which $\alpha_5$ and $\alpha_6$ are respectively substantially equal in value to $\alpha_1$ and $\alpha_2$ and are situated on the same side as the normal to the reference device as one another. The polarized colored second light beam is polarized with its E vector oriented substantially parallel to the grating lines of the reference device. This results in the reference device reflecting a polarized colored third light beam that has an angular range of angles of reflection between $\alpha_7$ and $\alpha_8$, in which $\alpha_7$ and $\alpha_8$ are respectively substantially equal in value to $\alpha_1$ and $\alpha_2$ and are situated on the opposite of the normal to the reference device from $\alpha_5$ and $\alpha_6$. The present invention determines whether or not the sample is genuine by respectively comparing the relative intensities (not the color) of the first, second and third light beams with one another. More specifically, the intensity of the colored third light beam is respectively compared to the intensity of the polychromatic first light beam and to the intensity of the colored second light beam. A sample is indicated as being genuine only if both the ratio of the intensity of the colored third light beam to the intensity of the polychromatic first light beam exceeds a first given threshold value and the ratio of the intensity of the colored third light beam to the intensity of the colored second light beam exceeds a second given threshold value.

Figure 1B:
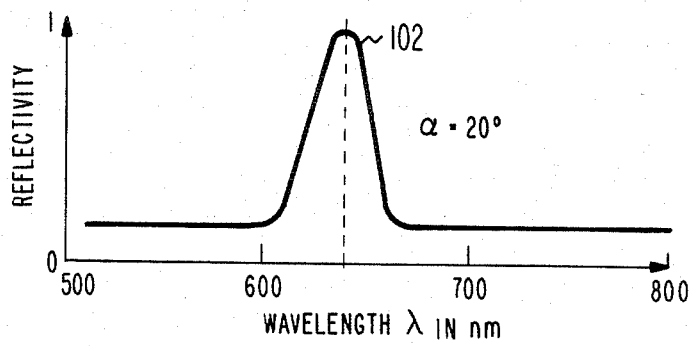
Figure 1C:
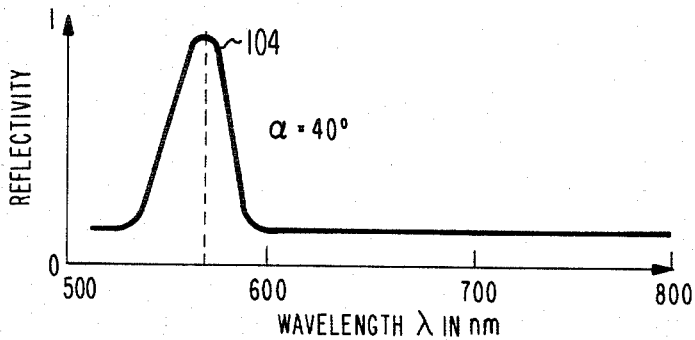

In the drawing:

FIGS. 1a, 1b, and 1c, respectively, are spectra plots of reflectivity as a function of light wavelength of an illustrative example of an authenticating device of the type disclosed in the aforesaid patent application Ser. No. 387,614, illuminated at each of three different angles of incidence ($\alpha = 0°$, 20° and 40°) with continuous-spectrum polychromatic light having its E vector polarized substantially parallel to the grating lines of the diffraction grating structure of the authenticating device; and FIGS. 2 and 2a show an illustrative embodiment of the present invention.

An authenticating device of a type disclosed in detail in the aforesaid patent application Ser. No. 387,614 is comprised of a diffraction grating structure operating as a diffractive subtractive color filter which is responsive to the angle of incidence of continuous-spectrum polychromatic illuminating light having its E vector polarized substantially parallel to the grating lines of the structure. Such an authenticating device derives reflected colored light having a wavelength spectrum within the continuous spectrum of the polychromatic illuminating light that includes at least one peak occurring at a wavelength that varies as a predetermined substantially linear function of the angle of incidence of the polychromatic illuminating light. FIGS. 1a, 1b, and 1c illustrate wavelength spectra of an illustrative example of such an authenticating device. As shown, the hue of the reflected colored light at any angle of incidence depends on the value of that angle of incidence. In particular, the wavelength subinterval extending from 600 to 700 nm corresponds to a range of color extending from an orange-red hue to an extremely deep red hue, while the wavelength subinterval extending from 550 to 600 nm corresponds to a range of colors extending from a green hue through orange and yellow hues to orange-red hue. Thus, as indicated by the wavelength position of peak 100 in FIG. 1a, white light incident at an angle of incidence $\alpha = 0°$ is reflected as a very deep red hue. As indicated by the wavelength position of peak 102 in FIG. 1b, white light incident at an angle of incidence $\alpha = 20°$ is reflected as a less deep red hue. As indicated by the wavelength position of peak 104 in FIG. 1c, white light incident at an angle of incidence $\alpha = 40°$ is reflected as a shade of a green hue.

For illustrative purposes, in describing the present invention, it is assumed that the reflectivity spectra shown in FIGS. 1a, 1b, and 1c, apply. However, in general, it should be understood that, in accordance with the teachings of the aforesaid patent application Ser. No. 387,614, the particular wavelength position of the reflectivity peaks at any angle of incidence is dependent on the exact values chosen for the various parameters of the diffraction grating structure of the authenticating device. Further, it is possible for some diffraction grating structures that for certain angles of incidence a second reflectivity peak may appear in the wavelength spectrum. However, this is not detrimental to the operation of the present invention. It is desirable that the reflectivity peaks should be as high as possible with respect to the background reflectivity, but there is no limit on the number of peaks in a wavelength spectrum.

Figure 2:
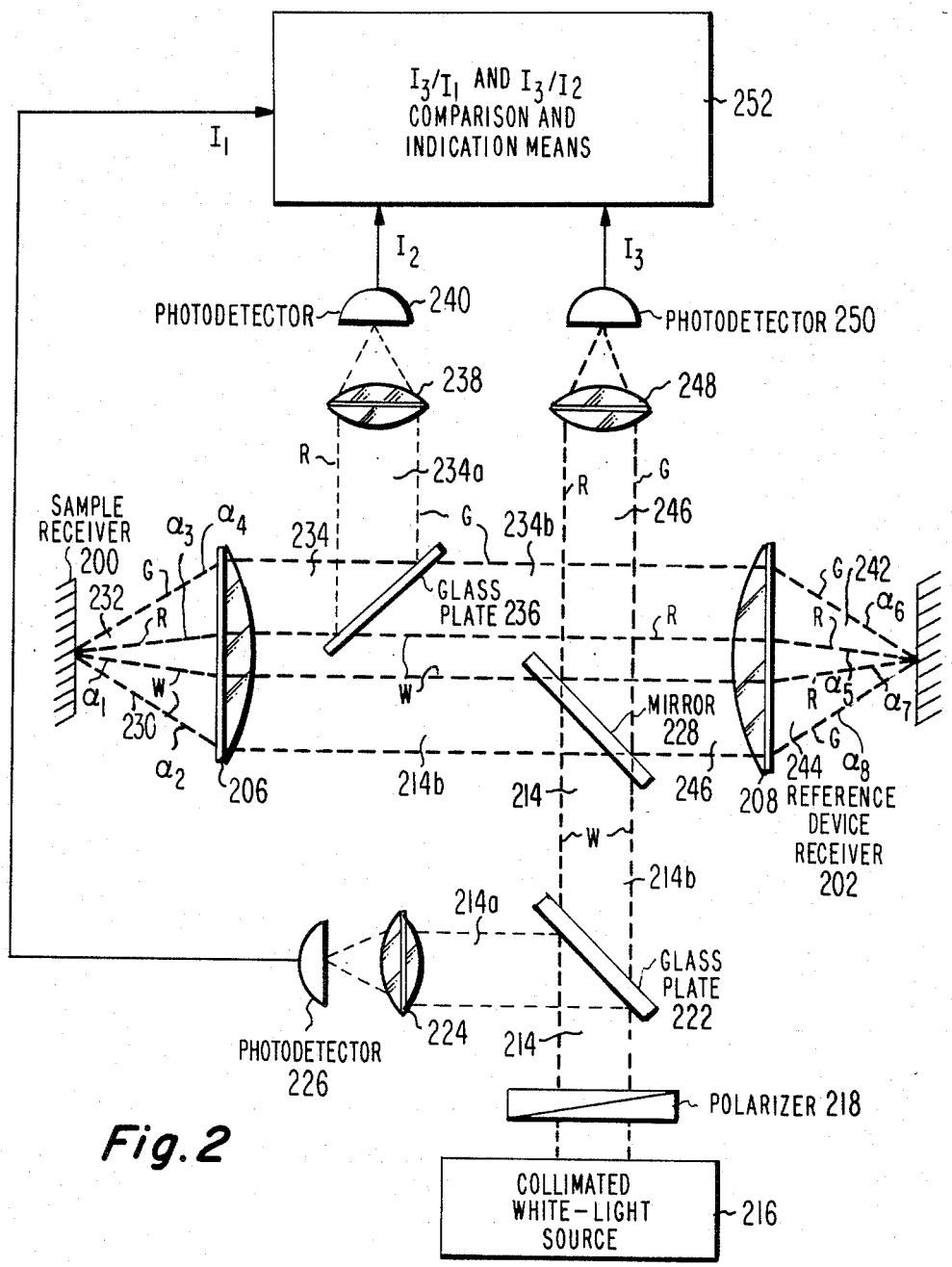
Figure 2A:
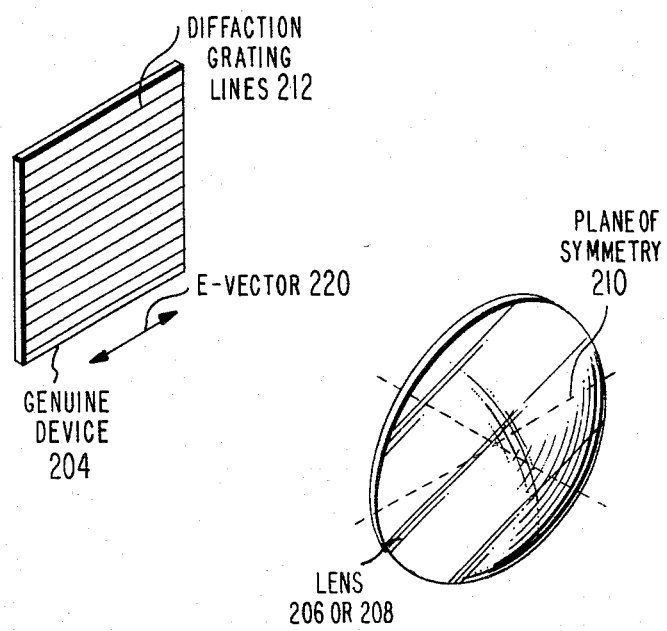

Referring to FIG. 2, there is shown sample receiver 200 and reference device receiver 202. Sample receiver 200 receives a sample which purports to be a given type of authenticating device that comprises a diffraction grating structure operating as a diffractive subtractive color filter in accordance with the teachings of the aforesaid U.S. patent application Ser. No. 387,614. Reference device receiver 202 receives a similar authenticating device that is known to be genuine. Receiver 200 is situated in the back focal plane of sample focusing lens 206 and reference device receiver 202 is located in the back focal plane of reference device of focusing lens 208. Lens 206 and 208, have substantially identical focal lengths. In any case, each of lenses 206 and 208 has a plane of symmetry 210 (shown in FIG. 2a) which divides the lens into symmetrical top and bottom halves. Plane of symmetry 210 is not shown in FIG. 2, since, in FIG. 2, the plane of symmetry is oriented perpendicular to the plane of the paper.

As indicated in FIG. 2a, a genuine device 204 received as a sample by receiver 200 is positioned with the diffraction grating lines 212 of the diffraction grating structure thereof oriented substantially parallel to the plane of symmetry 210 of lens 206. Similarly, a genuine device 204, used in the reference device, is received by reference device receiver 202 positioned with the diffraction grating lines 212 of the diffraction grating structure thereof oriented substantially parallel to the plane of symmetry 210 of lens 208. Thus, in FIG. 2, the diffraction grating lines of a genuine device received by either sample receiver 200 or reference device receiver 202 are oriented perpendicular to the plane of the paper.

A collimated beam 214 of polarized white-light having a continuous spectrum extending from 400–700 nm is generated by collimated white-light source 216 in cooperation with polarizer 218. Source 216 may be a simple inexpensive device comprised of a ten watt lamp energized by a six volt, 60 Hz AC output from a power supply requiring only a transformer. The resulting 120 Hz fluctuations in light intensity do not affect the performance of the testing system shown in FIG. 2. Polarizer 218 is angularly positioned to polarize beam 214 with its E vector oriented perpendicular to the plane of the paper. Therefore, as shown in FIG. 2a, E vector 220 is oriented substantially parallel to both plane of symmetry 210 and diffraction grating lines 212.

Glass plate 222, positioned as shown in the path of beam 214, operates as a beam splitter for reflecting about 20% of the wave energy of beam 214 into a monitoring component 214a and for transmitting the remainder of the wave energy of beam 214 into main component 214b of collimated white (W) light. Monitoring component 214a is focused by lens 224 on photodector 226, thereby producing an output $I_1$ from photodetector 226 having a value which is indicative of the intensity of beam 214 (and, hence, the intensity of main component 214b).

Main component 214b, after reflection from mirror 228, is incident on sample focusing lens 206. The respective width of main component 214b, the position of mirror 228, and the position of sample focusing lens 206, are such that the illumination of sample focusing lens 206 by collimated white-light main component 214b of beam 214 is confined to only a portion of the bottom half of sample focusing lens 206, as shown in FIG. 2. The collimated beam 214b of white light illuminating lens 206 is transformed thereby into a converging beam 230 of white light that illuminates the sample received by sample receiver 200. More particularly, the sample is simultaneously illuminated by converging beam 230 over an angular range of angles of incidence between $\alpha_1$ and $\alpha_2$, in which $\alpha_1$ and $\alpha_2$ are oblique anqles of incidence situated on the bottom side of the normal to the sample, as shown in FIG. 2. Converging beam 230 is polarized with its E vector oriented perpendicular to the plane of the paper (i.e., substantially parallel to diffraction grating lines 212 of FIG. 2a).

If the sample is genuine, it will reflect divergent beam 232 of polarized colored light (rather than white light), at an angular range of angles of reflection between $\alpha_3$ and $\alpha_4$, in which $\alpha_3$ and $\alpha_4$ are respectively substantially equal in value to $\alpha_1$ and $\alpha_2$ and are situated on the opposite (i.e., top) side of the normal to the sample from $\alpha_1$ and $\alpha_2$, as shown in FIG. 2. Assuming, for illustrative purposes, that a genuine sample exhibits the reflectivity spectra shown in FIGS. 1a, 1b, and 1c, and assuming further that $\alpha_1$ and $\alpha_3$ each have a value less than 20°, while $\alpha_2$ and $\alpha_4$ each have a value of about 40°, the color of divergent light beam 232 will vary from red (R) at $\alpha_3$ to green (G) at $\alpha_4$.

As shown in FIG. 2, diverging beam 232 is incident only on the top half of sample focusing lens 206. Sample focusing lens 206 transforms diverging colored-light beam 232 into collimated colored-light beam 234. Glass plate 236, which operates as a beam splitter in a manner similar to that of glass plate 222, reflects a monitoring component 234a of colored light beam 234, and transmits a main component 234b of colored light beam 234. Lens 238 and photodector 240 cooperate to produce an output $I_2$ from photodetector 240 which has a value indicative of the intensity of colored light beam 234 (and, hence, the intensity of main component 234b).

As shown in FIG. 2, main component 234b of colored light, which illuminates the top half of reference device focusing lens 208, is transformed by lens 208 into converging beam 242 of colored light. Since lens 208 has the same focal length as lens 206, a reference device received by reference device receiver 202 is simultaneously illuminated by a converging beam 242 of colored light over an angular range of angles of incidence between $\alpha_5$ and $\alpha_6$, in which $\alpha_5$ and $\alpha_6$ are respectively substantially equal in value to $\alpha_1$ and $\alpha_2$ and are situated on the same (top) side of the normal to a reference device. Further, converging beam 242 is polarized with its E vector perpendicular to the plane of the paper, and hence, parallel to diffraction grating lines 212 of the reference device.

Based on the above illustrative assumption, a genuine sample will exhibit the reflectivity spectra shown in FIGS. 1a, 1b, and 1c. Therefore, if the sample received by sample receiver 200 is, in fact, genuine, the colored-light spectrum of converging beam 242 at each angle of incidence within the angular range between $\alpha_5$ and $\alpha_6$ will exactly match the reflectivity spectrum of the reference device (known to be genuine) at that angle of incidence. Therefore, in the case of a genuine sample, the reference device will highly reflect all of the colored light in converging beam 242, thereby producing reflected diverging beam 244 of colored light that has an angular range of angles of reflection between $\alpha_7$ and $\alpha_8$, in which $\alpha_7$ and $\alpha_8$ are respectively substantially equal in value to $\alpha_1$ and $\alpha_2$, and are situated on the opposite (bottom) side of the normal to the reference device from $\alpha_5$ and $\alpha_6$. However, in the case in which the sample received by sample receiver 200 is counterfeit, the colored-light spectra of converging beam 242 at each angle of incidence within the angular range between $\alpha_5$ and $\alpha_6$ will not, for the most part, match the reflectivity spectra of the reference device. In this latter case, the relative intensity of reflected diverging beam 244 will be significantly lower than it would be for the case of a genuine sample received by sample receiver 200.

The diverging beam 244 of reflected colored light, which is incident on the bottom half of reference device focusing lens 208, is transformed by lens 208 into collimated beam 246 of colored light. Collimated beam 246, after reflection from mirror 228, is focused by lens 248 on photodetector 250. The output $I_3$ from photodetector 250 is indicative of the intensity of collimated beam 246 (and, hence, the intensity of reflected diverging beam 244).

The respective photodetected outputs $I_1$, $I_2$, and $I_3$ are applied as respective inputs to $I_3/I_1$ and $I_3/I_2$ comparison and indication means 252. Means 252 includes a first comparator for comparing the respective values of $I_3$ and $I_1$ with one another and a first indicator for indicating whether or not the ratio $I_3/I_1$ exceeds a first given threshold value. Means 252 further includes a second comparator for comparing the respective values of $I_3$ and $I_2$ with one another and a second indicator for indicating whether or not the ratio $I_3/I_2$ exceeds a second given threshold value.

The ratio $I_3/I_2$ is a measure of the correlation between the reflection spectra sample device and the reference device. It is clear that it is a necessary requirement for the verification of a genuine sample that $I_3/I_2$ exceed the first given threshold value (indicative of a high correlation). However, this, in itself, is not sufficient. It is conceivable that a counterfeit authenticating device structure might be made, which, for example, reflected, at near normal incidence, red light strongly, but which at other angles had a low reflectivity for all wavelengths. Such a structure would satisfy the requirements that the ratio $I_3/I_2$ be high, despite the fact that the sample is counterfeit. However, since only red light is reflected by the sample and only for near normal incidence, the absolute value of $I_3$ is much lower than it would be for a genuine sample. Thus, in order to make certain that the sample is genuine, means 252 requires that both $I_3/I_2$ and $I_3/I_1$ exceed their respective given threshold values.

Some of the benefits of the testing system shown in FIG. 2 are that there are no moving parts, that only simple optical components are used in its construction, and that such a testing system is both inexpensive to produce and reliable in its operation.

For instance, the ability of the system shown in FIG. 2 to distinguish between genuine and counterfeit authenticating devices incorporating the principles of the aforesaid U.S. patent application Ser. No. 387,614, can be gauged from the following results obtained in practice. A calibration value of $I_3/I_2$ was obtained by using a plane reflector (a piece of glass or a mirror) as a sample. Such a plane reflector resulted in some value R for the ratio $I_3/I_2$. When a sample known to be genuine was used, the value of the ratio $I_3/I_2$ rose to about 2 R. On the other hand, all counterfeit samples, such as colored mirrors, gratings, interference films, etc., that have been tried have never produced a value for the intensity ratio $I_3/I_2$ greater than 1.1 R. Therefore, the system shown in FIG. 2 is able to distinguish very sensitively between genuine and counterfeit authenticating devices of the type incorporating the teachings of the aforesaid patent application Ser. No. 386,614.

In FIG. 2, the polychromatic illuminating light is white light having a continuous spectrum from 400 to 700 nm. However, the polychromatic illuminating light need not include the entire white-light spectrum. For instance, in the case of the spectra shown in FIGS. 1a, 1b and 1c, the continuous spectra of the polychromatic illuminating light need not include blue light (i.e., 400–500 nm).

What is claimed is:

1. A testing method for verifying whether a sample purporting to be a given type of authenticating device for an item of sheet material is genuine, wherein a genuine device of said given type is comprised of a diffraction grating structure operating as a diffractive subtractive color filter responsive to the angle of incidence of continuous-spectrum polychromatic illuminating light having its E vector polarized substantially parallel to the grating lines of said structure, said filter deriving reflected colored light having a wavelength spectrum within said continuous spectrum that includes at least one peak occurring at a wavelength that varies as a predetermined substantially linear function of the angle of incidence of said polychromatic illuminating light, said method comprising the steps of:

(a) simultaneously illuminating said sample with a continuous spectrum polarized polychromatic first light beam over an angular range of angles of incidence between $\alpha_1$ and $\alpha_2$, in which $\alpha_1$ and $\alpha_2$ are two different oblique angles of incidence situated on the same given side of the normal to said sample as one another, said polarized polychromatic first light beam being polarized with its E vector oriented substantially parallel to the grating lines of a genuine sample, whereby a genuine sample reflects a polarized colored second light beam that has an angular range of angles of reflection between $\alpha_3$ and $\alpha_4$, in which $\alpha_3$ and $\alpha_4$ are respectively equal in value to $\alpha_1$ and $\alpha_2$ and are situated on the opposite side of the normal to said sample from $\alpha_1$ and $\alpha_2$;

(b) simultaneously illuminating a reference device known to be a genuine given type of authenticating device with said polarized colored second light beam over an angular range of angles of incidence between $\alpha_5$ and $\alpha_6$, in which $\alpha_5$ and $\alpha_6$ are respectively substantially equal in value to $\alpha_1$ and $\alpha_2$ and are situated on the same side of the normal to said reference device as one another, said polarized colored second light beam being polarized with its E vector oriented substantially parallel to the grating lines of said reference device, whereby said reference device reflects a polarized colored third light beam that has an angular range of angles of reflection between $\alpha_7$ and $\alpha_8$, in which $\alpha_7$ and $\alpha_8$ are respectively equal in value to $\alpha_1$ and $\alpha_2$ and are situated on the opposite side of the normal to said reference device from $\alpha_5$ and $\alpha_6$; and (c) respectively comparing the intensity of said colored third light beam to the intensity of said polychromatic first light beam and to the intensity of said colored second light beam for indicating said sample to be genuine only in response to both the ratio of the intensity of said colored third light beam to the intensity of said polychromatic first light beam exceeding a first given threshold value and the ratio of the intensity of said colored third light beam to the intensity of said colored second light beam exceeding a second given threshold value.

2. The testing method defined in claim 1, wherein step (a) comprises the step of illuminating said sample with a white-light first beam having a continuous spectrum over the visible light spectrum of 400–700 nanometers.

3. A testing system for verifying whether a sample purporting to be a given type of authenticating device for an item of sheet material is genuine, wherein a genuine device of said given type is comprised of a diffraction grating structure operating as a diffractive subtractive color filter responsive to the angle of incidence of continuous-spectrum polychromatic illuminating light having its E vector polarized substantially parallel to the grating lines of said structure, said filter deriving reflected colored light having a wavelength spectrum within said continuous spectrum that includes at least one peak occurring at a wavelength that varies as a predetermined substantially linear function of the angle of incidence of said polychromatic illuminating light; said system comprising:

(a) first means for simultaneously illuminating said sample with a continuous spectrum polarized polychromatic first light beam over an angular range of angles of incidence between $\alpha_1$ and $\alpha_2$, in which $\alpha_1$ and $\alpha_2$ are two different oblique angles of incidence situated on the same given side of the normal to said sample as one another, said polarized polychromatic first light beam being polarized with its E vector oriented substantially parallel to the grating lines of a genuine sample, whereby a genuine sample reflects a polarized colored second light beam that has an angular range of angles of reflection between $\alpha_3$ and $\alpha_4$, in which $\alpha_3$ and $\alpha_4$ are respectively equal in value to $\alpha_1$ and $\alpha_2$ and are situated on the opposite side of the normal to said sample from $\alpha_1$ and $\alpha_2$;

(b) second means for simultaneously illuminating a reference device known to be a genuine given type of authenticating device with said polarized colored second light beam over an angular range of angles of incidence between $\alpha_5$ and $\alpha_6$, in which $\alpha_5$ and $\alpha_6$ are respectively substantially equal in value to $\alpha_1$ and $\alpha_2$ and are situated on the same side of the normal to said reference device as one another, said polarized colored second light beam being polarized with its E vector oriented substantially parallel to the grating lines of said reference device, whereby said reference device reflects a polarized colored third light beam that has an angular range of angles of reflection between $\alpha_7$ and $\alpha_8$, in which $\alpha_7$ and $\alpha_8$ are respectively equal in value to $\alpha_1$ and $\alpha_2$ and are situated on the opposite side of the normal to said reference device from $\alpha_5$ and $\alpha_6$; and (c) third means for respectively comparing the intensity of said colored third beam to the intensity of said polychromatic first light beam and to the intensity of said colored second light beam for indicating said sample to be genuine only in response to both the ratio of the intensity of said colored third light beam to the intensity of said polychromatic first light beam exceeding a first given threshold value and the ratio of the intensity of said colored third light beam to the intensity of said colored second light beam exceeding a second given threshold value.

4. The testing system defined in claim 3, wherein said first means includes:

(a) a sample focusing lens having a given focal length and a given spatial plane of symmetry that divides said sample lens into first and second portions situated on opposite sides of its axis of symmetry;

(b) a sample-receiving means situated in the back focal plane of said sample lens for positioning a received genuine sample with its grating lines oriented substantially parallel to said plane of symmetry of said sample lens;

(c) light source means for generating a first collimated beam of said polychromatic light;

(d) optical means including a polarizer in the path of said collimated beam for directing said first collimated beam to be incident only on said first portion of said sample lens, said polarizer being angularly oriented to polarize said incident first collimated beam with its E vector substantially parallel to said plane of symmetry of said sample lens, so that said sample is illuminated by a converging beam of light having an angular range of angles of incidence between $\alpha_1$ and $\alpha_2$, to thereby reflect a diverging beam of light having said angular range of angles of reflection between $\alpha_3$ and $\alpha_4$, which diverging beam is incident only on said second portion of said sample lens, whereby a polarized colored second collimated beam of light emerges from said second portion of said sample lens.

5. The testing system defined in claim 4, wherein said light source means generates a white-light first collimated beam having a continuous spectrum over the visible light spectrum of 400–700 nanometers.

6. The testing system defined in claim 4, wherein said second means includes:
   (a) a reference-device focusing lens having said given focal length and a given spatial plane of symmetry that divides said reference-device lens into first and second portions situated on opposite sides of its axis of symmetry;
   (b) a reference-device-receiving means situated in the back focal plane of said reference-device lens for positioning the grating lines of a received reference device with its grating lines oriented substantially parallel to said plane of symmetry of said reference-device lens; and
   (c) second optical means in the path of said second collimated beam for directing said second collimated beam to be incident on only said first portion of said reference-device lens with the E vector of said incident second collimated beam being polarized substantially parallel to said plane of symmetry of said reference-device lens, so that said reference device is illuminated by a converging beam of light having said angular range of angles of incidence between $\alpha_5$ and $\alpha_6$, to thereby reflect a diverging beam of light, having said angular range of angles of reflection between $\alpha_7$ and $\alpha_8$, which diverging beam is incident only on said second portion of said reference-device lens, whereby a polarized colored third collimated beam of light emerges from said reference-device lens.

7. The testing system defined in claim 6, wherein said light source means generates a white-light first collimated beam having a continuous spectrum over the visible light spectrum of 400–700 nanometers.

8. The testing system defined in claim 6, wherein said third means includes:
   (a) first detection means for monitoring the intensity of said first collimated beam;
   (b) second detection means for monitoring the intensity of said second collimated beam;
   (c) third detection means for monitoring the intensity of said third collimated beam; and
   (d) comparison and indication means responsive to the respective outputs of said first, second and third detection means for deriving said indication of a genuine sample.

9. The testing system defined in claim 8, wherein said light source means generates a white-light first collimated beam having a continuous spectrum over the visible light spectrum of 400–700 nanometers.

10. The testing system defined in claim 3, wherein said first means comprises means for illuminating said sample with a white-light first beam having a continuous spectrum over the visible light spectrum of 400–700 nanometers.

* * * * *